A. Y. McDONALD.
Weighing Scales.

No. 53,020. Patented March 6, 1866.

Witnesses:

Inventor:
A. Y. McDonald

UNITED STATES PATENT OFFICE.

A. Y. McDONALD, OF DUBUQUE, IOWA.

IMPROVEMENT IN BALANCES.

Specification forming part of Letters Patent No. 53,020, dated March 6, 1866.

*To all whom it may concern:*

Be it known that I, ANDREW Y. McDONALD, of Dubuque, in the county of Dubuque and State of Iowa, have invented new and useful Improvements in Weighing-Scales; and I do hereby declare that the following is a full, clear, and exact description thereof, which will enable others skilled in the art to make and use the same, reference being had to the accompanying drawings, forming part of this specification.

The present invention consists principally in the use of a horizontal frame, having bearings at one end within an outer casing or box, upon which frame the platform or plate used to hold or receive the articles to be weighed is placed and rests, said frame being connected at its other end, by and through an arrangement of devices to be hereinafter particularly described, with an index-hand or pointer of a properly-graduated dial-plate for indicating the weight of the articles in pounds and fractions of a pound, according to the depression of the said platform by the same.

Figure 1:
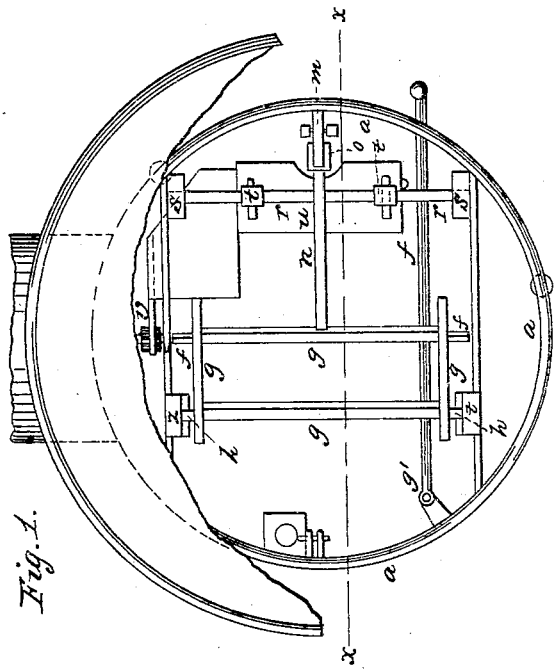
Figure 2:
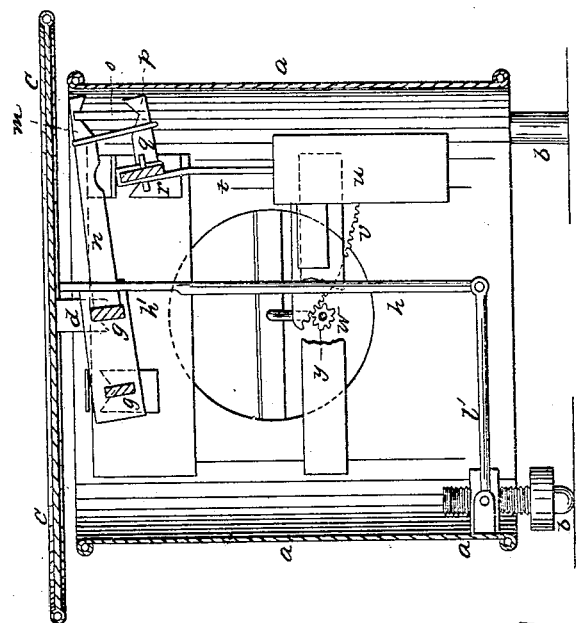

In the accompanying plate of drawings my improvements are represented, Figure 1 being a plan or top view with the top or weighing plate or platform removed; Fig. 2, a sectional view in a vertical plane through the line $x\ x$, Fig. 1; and Fig. 3 a detail view of dial-plate and index-hand or pointer.

$a\ a$ represent the outer casing, made of a cylindrical shape, open at both ends and set upon short legs, $b\ b\ b$.

$c$ is the plate or platform on which the articles to be weighed are laid, said plate, by its projecting pieces $d\ d$ on its under side, resting and bearing upon the short arms $f f$ upon each end of the horizontal frame $g$.

The frame $g$ is hung at each end by short shafts $h\ h$ within suitable bearings $l\ l$ of the outer casing, $a$, and the outer end, $m$, of its projecting arm $n$, is connected by and through a link $o$ to and with the outer end, $p$, of a short projecting arm, $q$, secured to the bar $r$ at or near its center, and turning in bearings $s\ s$ at each end within the outer casing or box.

To and upon the bar $r$, and below the same is hung, by rods $t\ t$, a weight, $u$, made of any suitable material and shape, on one side of which is secured one end of a toothed rack-bar, $v$, engaging with the toothed pinion $w$ of the horizontal shaft $y$, passing outward through the casing $a$, having upon its outer end an index-pointer, $z$, moving over the graduated circular disk or plate $a$, divided in the proper manner for indicating the weight in pounds and fractions of a pound of the article or articles placed upon the platform $c$ of the scales, as will be presently described.

Figure 3:
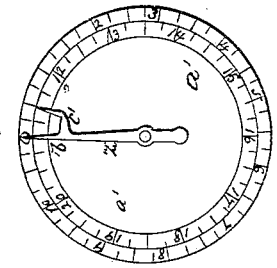

The graduated scale is made with a double series of divisions, as represented in Fig. 3, the index-pointer having two points, $b'$ and $c'$, respectively, for each row of said divisions, and the divisions being numbered from 0 to 20, as seen in Fig. 3.

Placing the article or articles to be weighed upon the platform $c$ it is depressed in direct proportion thereto, and bearing down upon the frame $g$, hung in the outer casing, $a$, as described, through its projecting pieces $d\ d$; it correspondingly depresses the same, turning it in its bearings, which, through its arm $n$, connected by and through the weight, rack-bar, and pinion, with the index-hand, as hereinabove particularly described, proportionally actuates the same, the parts of the machine being so arranged with regard to each other that the index-hand shall be so operated by and through the devices described as to point at the proper division upon the graduated plate to indicate the exact number of pounds and fractions of a pound contained in the article or articles being weighed, as is evident without further description.

The object of the double row of divisions is to enable the machine to be used for the weighing of articles of considerable weight, the second or inner row serving to indicate, through the pointer $c'$ of the index, the pounds and fractions of a pound contained in the articles when they exceed the full number of pounds expressed in the outer circle or row of divisions.

Still another graduated circle within the inner one, $c'$, could be formed, if desired, but I deem two all that are necessary when the scales are to be used for ordinary purposes.

The proportion of the parts and of the dial may be varied in many respects without departing from the principles of my invention, as before stated.

In case the scales should be placed upon an uneven surface, in which case its weight $u$ would have a tendency to swing out of its true position, thus causing the index-hand to be in direct proportion moved away from its zero-point, at which it should point when the scales are not in use, I arrange the legs $b\ b$, one of which is seen in Fig. 2, to and within the outer case, $a$, in such a manner that, by turning the same up or down, the case $a$ can be adjusted to the proper position or "leveled" to bring its index-pointer to the proper graduation of the scale, as is evident without further description.

$f'$ is a rod, hung at $g'$ to the interior of the casing $a$, and projecting outside of the same by one side of the weight $u$, by moving which toward and bringing it in contact with the weight the violent or quick vibrations of the same can be prevented, thus facilitating the weighing operation.

To steady the weighing-platform in its movement up and down I attach to the center of the same, upon its under side, a vertical rod, $h'$, hinged by a connecting-bar, $l'$, to the outer casing, $a$.

I claim as new and desire to secure by Letters Patent—

The general arrangement of the scale herein described, the same consisting in suspending the platform upon which the material to be weighed is placed to and upon the swinging frame $g$, connected by and through the weight $u$ with the index-hand $z$, substantially in the manner and operating as specified, ANDREW Y. McDONALD.

Witnesses:
ROBT. A. BUSBY,
JOHN M. BUCHHOTZ.